United States Patent
Larson et al.

[11] Patent Number: 5,502,582
[45] Date of Patent: Mar. 26, 1996

[54] LIGHT SOURCE COOLER FOR LCD MONITOR

[75] Inventors: Ralph I. Larson, Bolton, Mass.;
Richard J. Phillips, Alachua, Fla.;
Lawrence Guzowski, Tolland, Conn.;
Victor M. Samarov, Carlisle, Mass.

[73] Assignee: Aavid Laboratories, Inc., South Lancaster, Mass.

[21] Appl. No.: 300,373

[22] Filed: Sep. 2, 1994

[51] Int. Cl.⁶ ............................ G02F 1/1335; F28D 15/00
[52] U.S. Cl. ......................................... 359/49; 165/104.21
[58] Field of Search ............................ 359/50, 49, 86; 165/104.21; 315/112

[56] References Cited

U.S. PATENT DOCUMENTS

| | | | |
|---|---|---|---|
| 4,634,225 | 1/1987 | Haim et al. | 359/86 |
| 4,730,663 | 3/1988 | Völkl et al. | 165/32 |
| 4,925,295 | 5/1990 | Ogawa et al. | 353/57 |
| 5,000,256 | 3/1991 | Tousignant | 165/46 |
| 5,299,038 | 3/1994 | Hamada et al. | 359/49 |
| 5,321,595 | 6/1994 | Jacobi et al. | 362/373 |

*Primary Examiner*—William L. Sikes
*Assistant Examiner*—Charles Miller
*Attorney, Agent, or Firm*—Bookstein & Kudirka

[57] ABSTRACT

A liquid crystal (LC) display monitor has a high luminosity light source to provide good visibility in brightly lit areas. To prevent overheating of the LC screen and other components of the monitor, a two-phase cooler is provided. The cooler consists of two translucent, flexible bag-like containers, each conforming to a different side of the light source. A low-boiling point coolant within the containers absorbs heat from the light source and is partially vaporized. The coolant vapor travels from the containers into a condenser which is external to the monitor cabinet. The condenser draws thermal energy out of the coolant vapor, causing it to condense and return to the containers. The containers provide shock absorption to protect the light source, and the containers or the coolant may have light-scattering properties to provide diffusion of the light. Other alternatives include locating the light source within the containers or placing the container in contact with the LC screen rather than with the light source.

50 Claims, 5 Drawing Sheets

LIGHT SOURCE COOLER FOR LCD MONITOR

BACKGROUND OF THE INVENTION

Computers are often used with monitors or displays. These monitors typically provide good black and white or color images if the area where the display is located is not too bright. However, if the ambient light directed at the display is too bright, then glare, or light reflected from the screen, can make it tiresome to look at the information displayed on the screen. In severe lighting environments, such as outdoors and/or in direct sunlight, it can be nearly impossible to see what is displayed on the screen. Furthermore, the low back-lighting of these displays often makes it difficult to read them when viewing the display screen at an angle.

One type of computer monitor, which is attractive for its compactness and light weight, is a back-lit liquid crystal display (LCD). A light source, usually located behind the display's liquid crystal panel, emits light which must pass through the panel out towards the user. There is usually a diffuser located between the light source and the LC panel to provide uniform back lighting so that the user can not see the light source behind the LC panel.

If more light was emitted by the display screen, the signal (information displayed on the screen) to noise (glare) ratio could be significantly improved. This would, in turn, make it easier, and possible in even the brightest locations, to view what is displayed. The increased light would also allow viewing of the screen from a wider angle relative to a position directly in front of the screen. However, to increase the light emitted by the LC panel would require a much brighter back lighting source.

The use of a brighter light source presents several problems. A first problem is that increasing the amount of light transmitted through the screen also significantly increases the amount of thermal energy absorbed by the LC panel. This prolonged, excessive thermal exposure can cause the LC panel to fail.

A second problem with significantly increasing the amount of emitted light is that the risk of the light source overheating also increases. To avoid such overheating, a large amount of heat must be dissipated to the outside of the monitor or display cabinet. Conventional heat transfer devices are simply not equipped to handle such a high volume of thermal energy in such a compact environment.

U.S. Pat. No. 3,330,130 to Schraith, et al. teaches a cooling device for a fluorescent lamp. However, the system is clearly too bulky for an LC display, and lacks the heat transfer characteristics necessary to dissipate enough heat to cool a light source bright enough to provide the desired back lighting.

A third problem with increasing the power of the light source is that as the temperature surrounding the source increases beyond a certain point, the efficiency of the light source (i.e. the light emitted relative to the power consumed) decreases. Furthermore, the elevated temperatures reduce the life span of the light source, such that the mean time between failure is higher with higher temperatures.

An additional problem with LC displays is the possibility of damage to the light source. The preferred light source for these displays is typically a glass flourescent tube, which is highly susceptible to breakage. Considering the harsh conditions faced by portable computers, it is desirable to protect the light source from shock and vibration which may damage it.

SUMMARY OF THE INVENTION

The present invention provides a cooling system for a light source, particularly a light source for an LC display. The cooling system uses one or more flexible bag-like containers that are in contact with the light source. The bag-like containers contain a coolant having a low vapor pressure. The coolant exists within the system in both a liquid phase and a vapor phase and, making use of the phase change of the coolant, provides enhanced transfer of heat away from the light source. Preferably, the excess heat is transferred to the exterior of any enclosure which may surround the light source, such as an LC display cabinet.

Much of the following description refers to the use of a single flexible coolant container, but it should be understood that more than one container may be used. For example, in a preferred embodiment, two containers are used on opposite sides of the light source. This provides optimum surface contact with the light source to efficiently transfer heat to the coolant.

The coolant container is positioned to be in intimate contact with the light source. If used with a video monitor, such as an LC display, the container is preferably located between the light source and the display screen, and acts like a filter, blocking infrared light directed toward the display screen. The container is make of a material that is, however, translucent to visible light. Thus, the container blocks the thermal radiation in the infrared range, while allowing the desired visible light to reach the screen.

The container is preferably a heat-sealable thermoplastic and is hermetically sealed to prevent leakage of the coolant within. It is also desirable to prevent any permeation of air into the container. Therefore, the container material is selected to have a low permeability to air, such that air diffusion into the bag is negligible.

The container is connected to a condenser by at least one flexible tube. The condenser is typically wide and relatively flat with fins to provide a large surface area. It may also be sized to fit within the cabinet of a video terminal containing the light source to be cooled. However, in the case of an LC display, an external condenser is preferable. The condenser is located above the container so that as the coolant in the container boils, the coolant vapor travels up the tube to the condenser. In the condenser, the coolant vapor condenses back into a liquid and returns by gravity to the container. Multiple tubes may be used to allow more coolant flow between the container and the condenser.

During operation of the light source, the liquid coolant in the container absorbs heat from the light source and is also heated by the absorption of infrared light traveling through the container. At a certain temperature, the coolant boils, thereby increasing the proportion of coolant vapor relative to coolant liquid in the container. Vapor from the container travels through the connecting tube to the condenser. The vapor condenses in the condenser, giving up heat, which is then dissipated through the walls of the condenser.

The condenser is preferably air-cooled, so that the heat is transferred to the ambient air located outside of the condenser. A fan may be used to move air across the condenser and increase the heat transfer. The condenser may also be liquid cooled, such that the heat is drawn away by a liquid surrounding the condenser. Once condensed, the coolant returns by gravity to the container.

In the preferred embodiment, the light source is a fluorescent tube which is sandwiched between two or more containers to improve heat transfer away from the light source. The containers are preferably vacuum-formed or pre-shaped to better conform to the tube surface. In this embodiment, the containers share one condenser although, alternatively, each could have its own. When the containers share a condenser, it is preferable to provide a bypass tube between the liquid reservoirs of the containers, such that the amount of liquid in each container remains roughly equal.

In an alternative embodiment, the light source is located within the container, immersed in a bath of liquid coolant. This allows cooling of the entire light source surface, and direct contact between the light source and the coolant for better heat transfer. For this embodiment, a dielectric coolant is preferred to prevent electrical shorting. Furthermore, to prevent leakage into or out of the container, electrical power connections are hermetically sealed through the bag seams.

Other variations on the preferred embodiment include the use of a coating material on the exterior of the container which absorbs infrared light, to further reduce the transfer of heat through the container to the LC display. Such a coating might also be used for the absorption of ultraviolet light which, if it reached the coolant, might tend to break down the coolant's molecular structure. A coolant, a coolant additive and/or an exterior container coating might also be selected for the purpose of diffusing the visible light passing through the container. This would reduce or eliminate the need for a separate diffuser between the light source and the LC screen. The desired diffusion might also be accomplished by the placement of translucent material adjacent a surface of the container which would scatter the visible light passing through it toward the display screen. This material might be a plurality of translucent spheres located within the container, or a woven translucent material either within or without the container. Finally, the LC display cabinet itself might be the condenser, to eliminate the need for a separate external condenser. Alternatively, the condenser could follow the contour of part or all of the outer surface of a standard LC display cabinet.

DETAILED DESCRIPTION OF THE PREFERRED EMBODIMENTS

Figure 1:
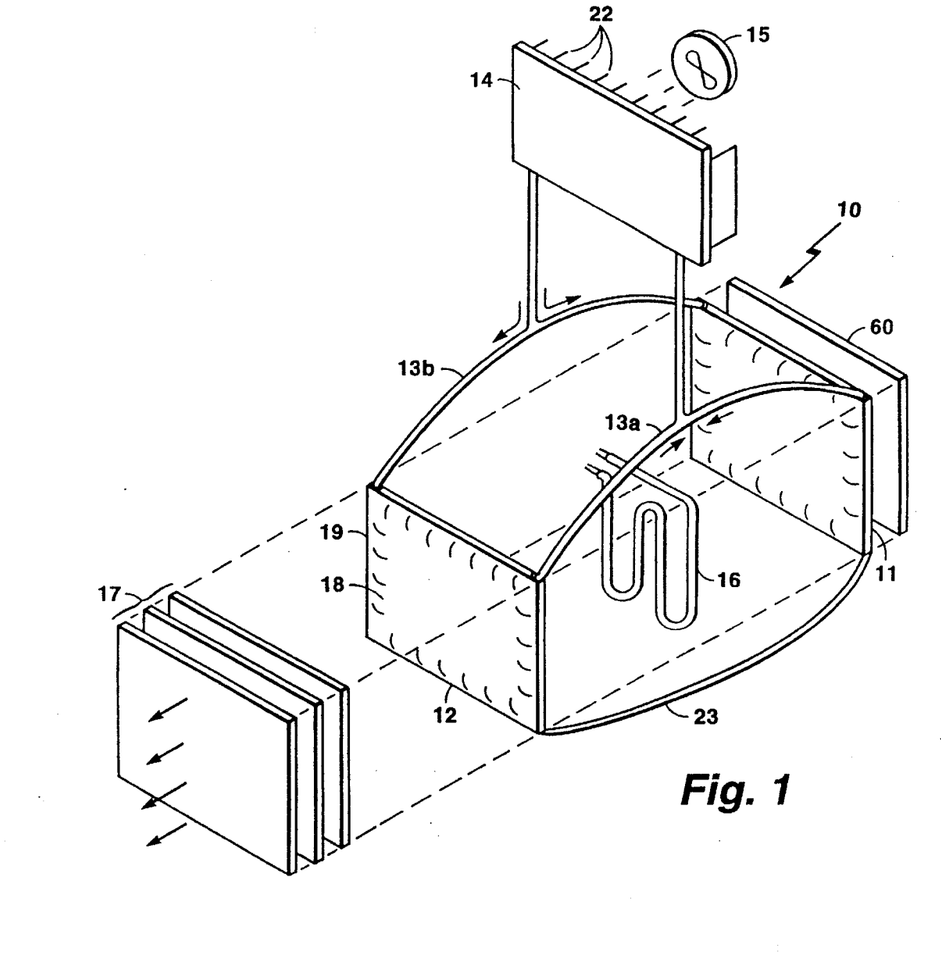
FIG. 1 is an isometric exploded view of a liquid-cooled LC display in accordance with the present invention.

FIG. 1 depicts a liquid-cooled filter diffuser for an LC display 10 that includes two flexible bag-like containers 11, 12 which are partially filled with liquid coolant 18. The coolant is a fluid having a relatively low boiling point, such as a fully perfluorinated fluorocarbon. A preferred coolant is Fluorinert™ FC-72, commercially available from Minnesota Mining and Manufacturing Company of St. Paul, Minnesota. A narrow vapor space 19 above the coolant 18 exists in each of the containers 11, 12 and is in fluid communication with a vapor supply tube 13a and a liquid return tube 13b. That is, each of the containers is connected to one supply tube 13a and one return tube 13b. Above the containers, the two supply tubes 13a are connected together and the two return tubes are connected together, and the united tube pairs each connect to condenser 14.

Figure 2:
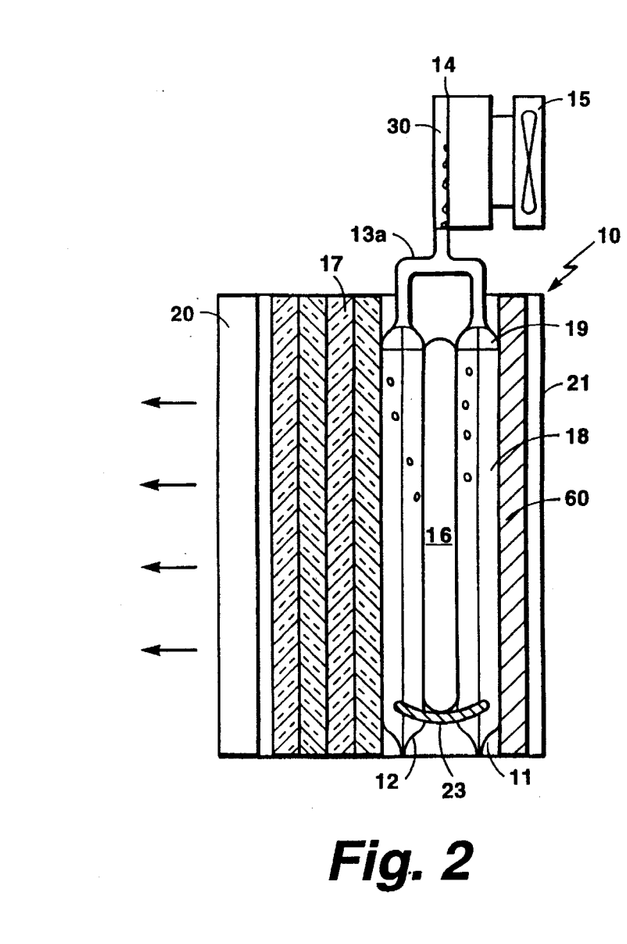
FIG. 2 is a side view of the display of FIG. 1.

As shown in FIG. 2, the two containers 11, 12 are located on either side of a light source 16 and in physical contact with the light source. The light source is a fluorescent bulb having a luminosity much higher than that of light sources in conventional LC displays. The light source 16 provides back lighting to an LC display screen 20, such as is used with a "laptop" or notebook-type computer. In generating such a high luminosity, the light source provides enhanced visibility to the LC screen, but also gives off a large amount of heat. This excess heat must be dissipated to avoid overheating of the LC screen or other display components.

The containers 11, 12 preferably consist of a translucent, flexible, heat-sealable, thermoplastic material such as a modified polyester terphthalate (PET) film. It is desirable that the material have low air permeability and sufficient flexibility that the internal pressure of the containers remains at or near the atmospheric pressure over the entire thermal operating range of the container. That is, as the temperature of the light source 16 increases, and a larger proportion of the coolant 18 changes from liquid to vapor, the flexible containers 11, 12 expand easily in response to the increase in volume of the coolant, and any pressure change in the containers is negligible. In this way, the boiling point of the coolant remains stable over the thermal operating range of the system. However, since the absolute stability of the boiling point is not required, the flexibility feature is a preference and not a requirement for the present invention.

In order to improve the heat transfer between the light source 16 and the containers 11, 12, the surface of the containers can be vacuum-formed to the surface of the light source or otherwise pre-formed to conform to its shape. If vacuum-formed, the heat sealing of the containers could be used around the perimeter of the light source to sustain the vacuum. Alternatively, the containers could be sealed to the surface of the light source bulb during manufacturing. In either case, the close conforming of the containers to the surface of the bulb provides more surface contact between the light source 16 and the containers, and a correspondingly more efficient heat transfer from the light source to the coolant 18.

When the LC display is switched on, the light source 16 begins emitting light and heat. A large portion of that heat is transferred by conduction and convection to the walls of containers 11, 12 and then to coolant 18 within. When the coolant has absorbed enough heat, boiling is initiated, and bubbles of coolant vapor rise to the narrow space 19 at the top of the containers 11, 12. The heated vapor then rises through vapor supply tubes 13a to condenser 14, where it gives up heat energy to the walls of the condenser.

Figure 3:
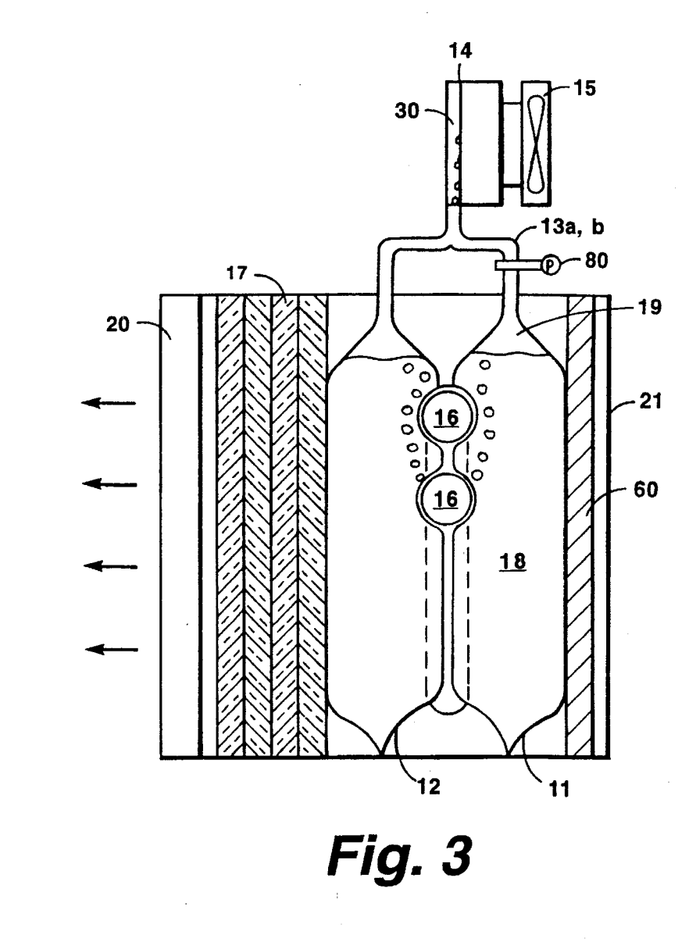
FIG. 3 is a cross sectional view of the display of FIG. 1.

Condenser 14 is made of a material having good heat conductivity and, as shown in FIG. 3, has an interior chamber 30 into which the coolant vapor rises. The condenser 14 may have fins 22 which increase the outer surface area of the condenser, and facilitate the transfer of heat from the condenser to the ambient air by conduction, convection and radiation. This transfer can be aided by fan 15 which blows air across the fins 22 of condenser 14, providing increased convection and allowing the size of the condenser to be kept to a minimum.

While the condenser 14 in the preferred embodiment is external to the display cabinet, it may also be located within the cabinet. However, this increases the required size of the cabinet, and does not provide heat transfer to the external ambient air as efficiently as the external condenser. One preferred alternative embodiment integrates the condenser into the structure of the cabinet itself. In that embodiment, the chamber of the condenser is located between an inner and an outer wall of the cabinet, and a fan is located immediately adjacent thereto. This embodiment allows the unit to remain compact, while still exposing a surface of the condenser 14 to ambient air. Alternatively, a similarly-shaped condenser unit could attached to the exterior of the cabinet, and follow a portion of its surface contour.

Other alternative embodiments include using a condenser which is water-cooled (rather than air-cooled), refrigerated or cooled in any other conventional manner.

In the embodiment of FIGS. 1-3, the coolant vapor enters condenser 14, and comes in contact with the walls of condenser chamber 30. The chamber walls draw heat from the vapor and transfer it through the condenser to the ambient air. As the thermal energy of the vapor is reduced, it condenses along the chamber walls, and passes by gravity down into liquid return tubes 13b and back into containers 11, 12. To keep the liquid level approximately equal in the two containers 11, 12, a bypass tube 23 provides an open fluid connection between the two containers 11, 12.

The bottom of chamber 30 can be set at an angle such that the condensed coolant flows back to containers 11, 12 only through return tubes 13b. However, it should be understood that it is not necessary for coolant to flow only one direction through the tubes. Liquid coolant (condensed vapor) and vapor can be counterflowing simultaneously in any of the tubes 13a, 13b. Furthermore, in a variation on the present embodiment, a small circulating pump 80 (as indicated in FIG. 3) may be included which forces coolant to circulate between the condenser and the reservoir of the containers 11, 12 in either a liquid or a vapor state. The forced fluid circuit between the condenser 14 and containers 11, 12 thus reduces the gravity sensitivity of the system.

Located near the back of the display 10 is a reflective metal or plastic sheet 60 which reflects light from light source 16 towards the front of the display. This helps increase the amount of light actually directed at the LC screen 20. Located between the front container 12 and the LC screen 20 are diffuser panels 17 which scatter the light into a uniform intensity beam. The diffuser panels provide an even distribution of light across the surface of the screen 20 and prevent a user from seeing the light source 16 directly through the screen 20.

Figure 4:
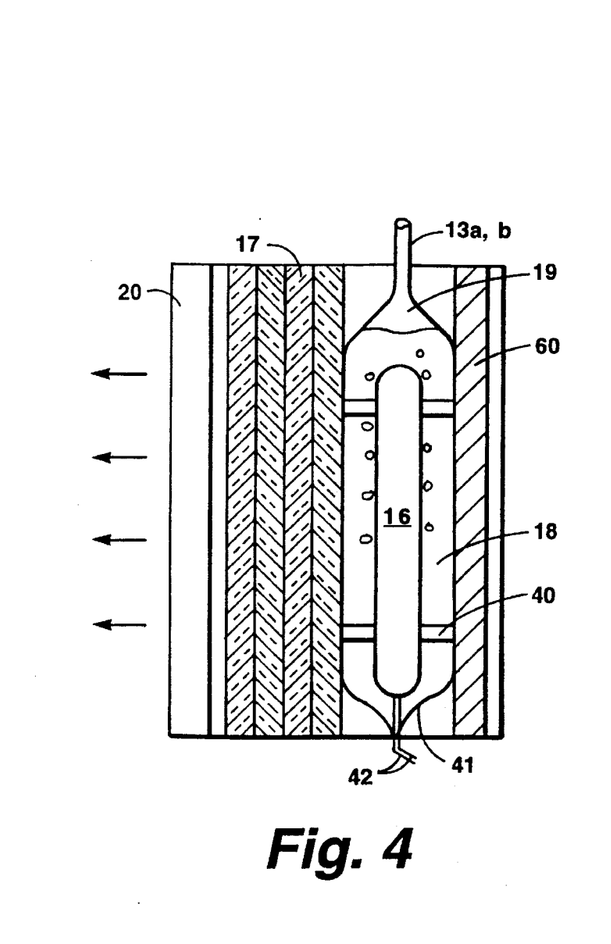
FIG. 4 is a side view of an alternative embodiment of the LC display of FIG. 1 in which the light source is contained within the coolant container.

Depicted in FIG. 4 is an alternative embodiment of the invention, in which the light source 16 is immersed in the liquid coolant 18 contained in a single flexible bag-like container 41. In this embodiment, a dielectric coolant is used so as to avoid any electrical conduction through the fluid itself. Electrical leads 42 are hermetically sealed through a wall of the container 41, preferably along any seams which may exist. Solid supports 40 between the light source 16 and the container walls keep the position of the light source fixed within the container. The supports 40 are preferably small and spaced apart from one another so as not to impede the bubbles of vapor which rise through the coolant liquid while it is boiling.

This embodiment provides direct contact between the coolant 18 and the light source 16, thus increasing the efficiency of the heat transfer. This arrangement also reduces the amount of coolant and number of container surfaces through which light from the light source must pass. Thus, any absorption or reflection of visible light which may occur due to the coolant or container surfaces is reduced.

Each embodiment of the present invention is adaptable to providing desired diffusion of the light from the light source. In one variation, the coolant is selected to have the desired light diffusion properties in addition to having the desired thermal properties. Thus, as the light passes through the coolant liquid, it is scattered by the molecules of the coolant itself. If a coolant is selected which has a sufficient amount of light scattering ability, the need for diffuser plates 17 is removed, significantly decreasing manufacturing costs. This variation, of course, works whether the light source is within a coolant container or surrounded by one or more coolant containers.

Each embodiment also is adaptable to removing thermal radiation in the form of infrared light by selection of a particular coolant and/or a particular container material or coating on the container. Many conventional LC displays use a mirror film in the rear of the display which reflects infrared light toward the front of the display. The absorption of most or all of the infrared radiation by the coolant and/or container may eliminate the need for these expensive mirror films. While the reflective sheet 60 of the FIGS. 1–3 embodiment also reflects visible light, to the extent that it is used solely for reflecting infrared light, it may be unnecessary if the correct coolant and/or container materials are selected.

One other alternative available for each embodiment is the use of a reflective film on the rear side of the container nearer the back of the display. With the reflective surface facing in toward the coolant, infrared light reaching the surface would be reflected back to the coolant for absorption. Such a film might also increase the amount of visible light reaching the front of the display over the amount which reaches using a reflective surface at the back of the monitor. This is due to the fact that the reflector at the back of the monitor directs a higher percentage of the light it reflects toward the top, bottom and sides of the display due to its further distance from the display screen.

Figure 5:
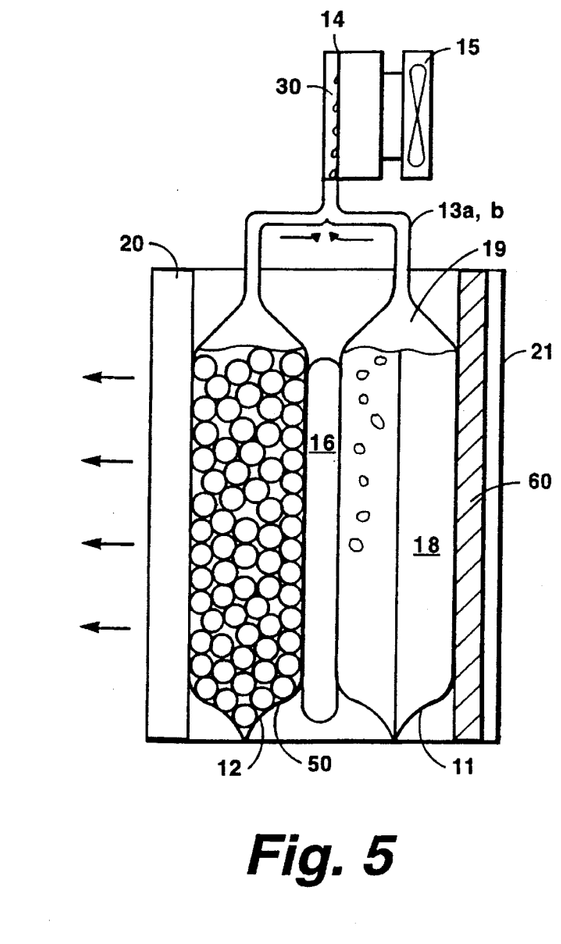
FIG. 5 is a side view of another alternative embodiment of the LC display of FIG. 1 in which diffusion material is located adjacent a surface of the coolant container.

Another embodiment of the invention which provides the desired diffusion is shown in FIG. 5. In this embodiment, the container positioned between the light source 16 and the LC screen 20 includes translucent material 50 which scatters visible light emitted from the light source. Light reflected from the reflective sheet 60 at the back of the display is also scattered by the material 50. Thus, the desired distribution of light at display screen 20 is achieved. As with a light-scattering coolant 18, the presence of the material 50 eliminates the necessity for the diffuser plates 17 of the embodiments of FIGS. 1–3.

In one instance, the material 50 may be a plurality of translucent spheres which reside within the container. In another, the translucent material 50 is a woven fabric such as polypropelene which may reside either within or without of the container. Such a fabric could be heat-sealed with the edges of the container to keep it in place.

Figure 6:
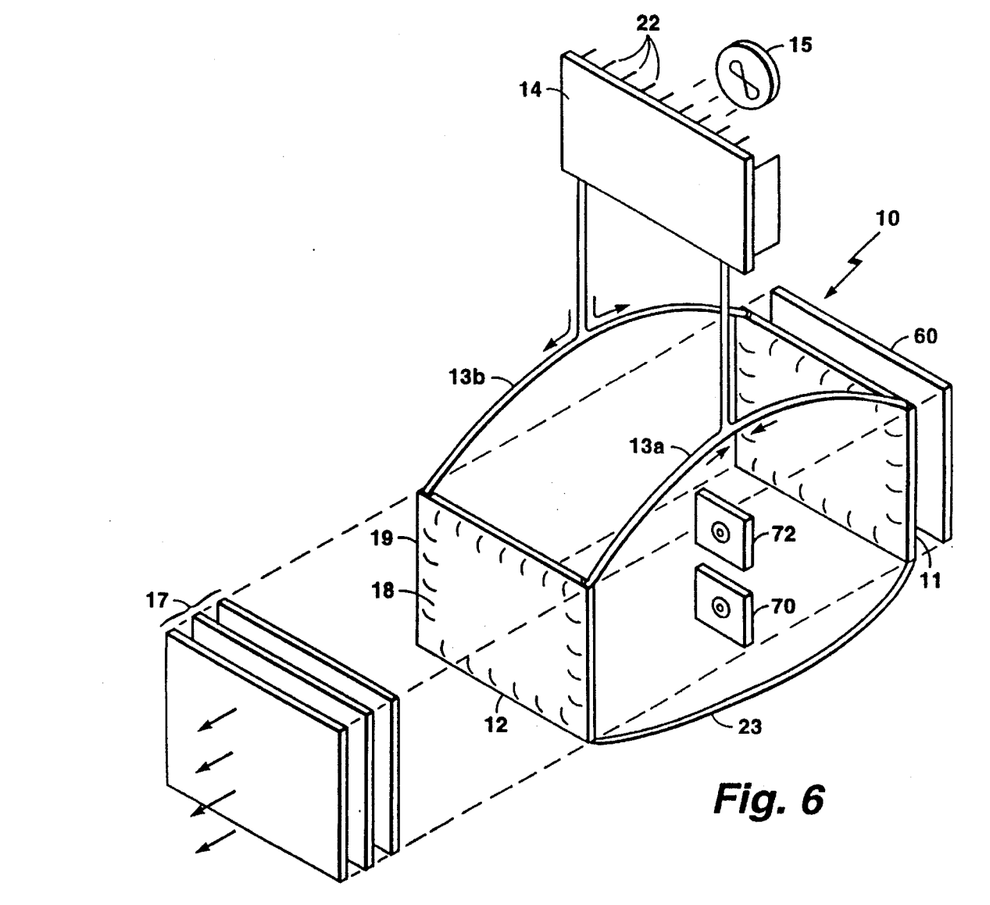
FIG. 6 is an isometric view of an embodiment of the invention which uses a point light source.

Depicted in FIG. 6 is another alternative embodiment of the present invention, in which the fluorescent bulb light source is replaced with a small xenon flash tube 70. This alternative light source is essentially a point source, and is much more compact than the fluorescent bulb, tending to use up less space in the display cabinet. Since it is a flash source, the xenon tube is strobed at a high speed (at least greater than thirty times per second) so that the flashing of the light is unnoticeable to the human eye. In the figure, the flash tube 70 is shown surrounded by the containers 11, 12 which provide the necessary cooling. However, the flash source may also be used with the immersion embodiment of FIG. 4, and may be combined with the described variations of using a light-scattering coolant or the translucent material 50 of FIG. 5.

Only one point source is required for the embodiment of FIG. 6. However, a second flash tube 72 is depicted in FIG. 6 to demonstrate a variation available with each of the embodiments above. That variation is the use of two light sources for redundancy purposes. In addition to, and next to, a single light source 70 (or 16 in the case of the FIGS. 1–3 embodiment), is located a second light source 72 wired in parallel with the first. The advantage provided is that upon failure of one of the light sources, the display continues to operate. The resulting decrease in illumination of the screen 20 makes it more difficult, but not impossible, to read. The lower illumination is also an indication to a user that one of the light sources has failed, and needs replacing.

Figure 7:
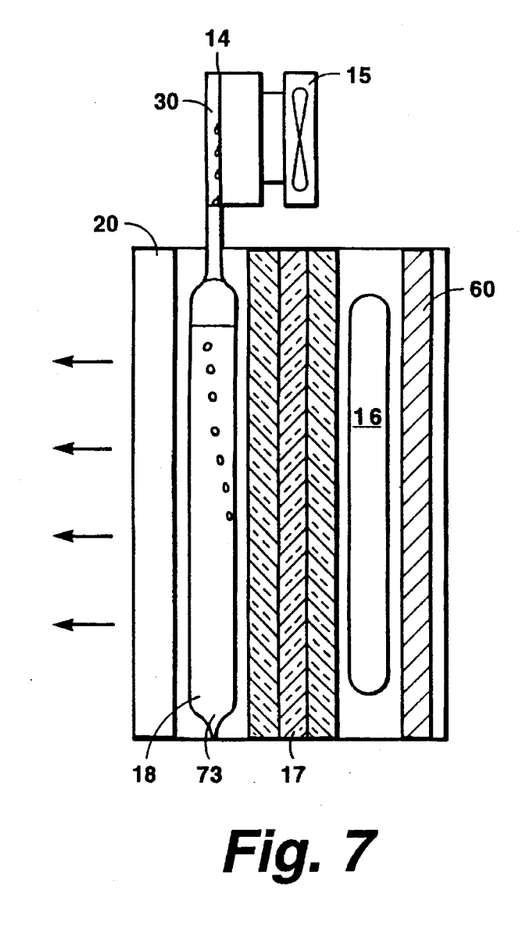
FIG. 7 is a side view of an embodiment of the present invention in which the LC screen is cooled instead of the light source.

Still another alternative embodiment is depicted in FIG. 7. In this embodiment, the LC screen 20 is cooled instead of the light source. A single container 73 is positioned in physical contact with LC screen 20. The construction of container 73 and the coolant 18 within it are essentially identical to that of the previous embodiments, except that only a single container 73 is required and it conforms to the surface of the display screen 20. In this embodiment, the light source 16 is a high luminosity light source, as in the other embodiments. However, instead of cooling the light source directly, the container 73 is positioned to keep the thermal energy from the light source from overheating the LC screen, both by cooling the screen 20 and by absorbing thermal energy directed toward the screen. Since the LC screen is usually the most thermally sensitive piece of equipment in the display, the other components in the display are selected to be thermally resistant, and are allowed to absorb heat from the light source. However, the screen 20 remains protected.

Each of the embodiments discussed provide cooling to allow a high luminosity light source to be used. However, in addition to providing cooling, each of the embodiments of the present invention also serves the secondary purpose of cushioning various components in the display to protect it from shock and vibration. Since the typical portable computer may be subjected to a regular regimen of bumping and jarring, the liquid/vapor filled containers 11, 12 provide significant cushioning to protect against the expected assortment of shocks and vibrations.

In the embodiments of FIGS. 1–3, 5 and 6, the direct contact between the light source and the outside of the containers provides cushioning of the light source. The same is true for the LC screen 20 of FIG. 7, which receives cushioning on the back of the screen from container 73. In the immersion embodiment of FIG. 4, the supports 40 are made of an elastic material which helps cushion the light source. In addition, the viscosity of the coolant itself helps to prevent against damage from sharp jolts.

Another variation appropriate for the different embodiments of the present invention is the use of a boiling initiator which induces boiling very close to the boiling point of the coolant. It is commonly understood in the art that when a liquid first begins heating up, its temperature may actually pass the boiling point before boiling actually begins. This phenomenon is known as thermal hysteresis, and can cause a device being cooled to operate out of its desired temperature range. Several different types of initiator techniques have been developed which are adaptable to the present invention. One is to provide "pitting" along an inner surface of the containers. Another is to intermix a residual, non-condensable gas with the coolant.

A preferred boiling initiation technique is to locate a low-level radioactive material where its radiation can interact with the coolant liquid. The interaction of the radiation with the molecules of the coolant induces boiling at or near the boiling point. This technique is fully described in pending patent application Ser. No. 08/216,483 entitled "TWO-PHASE COMPONENT COOLER WITH RADIOACTIVE INITIATOR", and assigned to the assignee of the present invention. In accordance with that disclosure, the introduction of spent uranium (U-238) pellets into containers 11, 12, 41 or 73, keeps the amount of thermal overshoot to a minimum.

The foregoing description has been limited to specific embodiments of the invention. As described, the invention provides an apparatus which cools the entire surface of a light source, increasing its efficiency, protecting it from shock and vibration and extending its life. This, in turn, allows for a brighter and more efficient LC display which is readable in bright ambient conditions, such as sunlight, and at wider viewing angles. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A lighting apparatus comprising:

a light source which generates light and heat;

a translucent container having a surface proximate to a surface of the light source and being positioned between the light source and a destination to be illuminated by the light from the light source such that light passes through a portion of the container prior to reaching said destination;

a coolant liquid contained within the container, a portion of which coolant vaporizes from absorption of the heat from the light source; and a condenser in fluid communication with the container, the condenser receiving vaporized coolant from the container and drawing thermal energy from the vaporized coolant to return the vaporized coolant to a liquid state.

2. A lighting apparatus according to claim 1 wherein the surface of the container is molded to a contour of the surface of the light source.

3. A lighting apparatus according to claim 1 wherein the container is flexible and conforms to the surface of the light source.

4. A lighting apparatus according to claim 3 wherein the container is constructed from a thermoplastic material.

5. A lighting apparatus according to claim 1 wherein the light source is located within the container.

6. A lighting apparatus according to claim 1 wherein the coolant liquid is substantially an electrical insulator.

7. A lighting apparatus according to claim 1 wherein the light source has a first side and a second side and wherein the container is a first container positioned to the first side of the light source and the apparatus further comprises a second translucent container having a surface proximate to a surface of the light source on the second side of the light source, said second container containing a coolant liquid and being in fluid communication with said condenser.

8. A lighting apparatus according to claim 7 further comprising a bypass tube providing fluid communication between the first container and the second container.

9. A lighting apparatus according to claim 1 wherein the condenser comprises an exterior surface having fins.

10. A lighting apparatus according to claim 1 further comprising a fan positioned relative to the condenser to blow air across the condenser.

11. A lighting apparatus according to claim 1 wherein the coolant liquid comprises a liquid having a boiling point which is relative to the desired efficiency and life expectancy of the light source.

12. A lighting apparatus according to claim 11 wherein the coolant liquid comprises a fully perfluorinated fluorocarbon.

13. A lighting apparatus according to claim 1 wherein the light source comprises a fluorescent tube.

14. A lighting apparatus according to claim 1 wherein the light source comprises a point source.

15. A lighting apparatus according to claim 14 wherein the light source comprises a strobe.

16. A lighting apparatus according to claim 1 wherein the container is coated with a light-scattering material.

17. A lighting apparatus according to claim 1 wherein the coolant has the property of scattering light which passes through it.

18. A lighting apparatus according to claim 1 further comprising translucent material located adjacent a surface of the container which scatters light passing through the material.

19. A lighting apparatus according to claim 18 wherein the translucent material comprises a plurality of translucent objects located within the container.

20. A lighting apparatus according to claim 18 wherein the translucent material comprises a woven fabric.

21. A lighting apparatus according to claim 1 further comprising a reflective surface which reflects light from the light source toward the destination to be illuminated.

22. A lighting apparatus according to claim 1 wherein the light source comprises two individual light-generating devices.

23. A lighting apparatus according to claim 1 further comprising a circulator which causes movement of coolant between the container and the condenser.

24. A lighting apparatus according to claim 1 wherein the container and the coolant absorb shock and vibration from the light source.

25. A liquid crystal display monitor comprising:

a liquid crystal display screen;

a light source which generates heat and which provides back lighting to the display screen;

a translucent container having a surface proximate to a surface of the light source and being located such that light emitted by the light source passes through a portion of the container prior to reaching the display screen;

a coolant liquid contained within the container, a portion of which coolant vaporizes from absorption of the heat from the light source; and a condenser in fluid communication with the container, the condenser receiving vaporized coolant from the container and drawing thermal energy from the vaporized coolant to return the vaporized coolant to a liquid state.

26. A display monitor according to claim 25 wherein the container comprises a flexible material which conforms to the surface of the light source.

27. A display monitor according to claim 25 wherein the container comprises a thermoplastic material.

28. A display monitor according to claim 25 wherein the light source is located within the container.

29. A display monitor according to claim 25 wherein the light source has a first side and a second side and wherein the container is a first container positioned to the first side of the light source and the display monitor further comprises a second translucent container having a surface proximate to a surface of the light source on the second side of the light source, the second container containing a coolant liquid and being in fluid communication with the condenser.

30. A display monitor according to claim 29 further comprising a bypass tube providing fluid communication between the first container and the second container.

31. A display monitor according to claim 25 wherein the light source comprises a fluorescent tube.

32. A display monitor according to claim 25 wherein the light source comprises a point source.

33. A display monitor according to claim 32 wherein the light source comprises a strobe lamp.

34. A display monitor according to claim 25 wherein the light source comprises a first surface and wherein the container is in physical contact with the first surface of the light source.

35. A display monitor according to claim 25 further comprising at least one diffusion plate located between the light source and the display screen.

36. A display monitor according to claim 25 further comprising a translucent material located adjacent a surface of the container that scatters light passing through the material.

37. A display monitor according to claim 25 wherein the container comprises a first surface and the first surface is coated with a light-scattering material.

38. A display monitor according to claim 25 wherein the coolant comprises a substance which has the property of scattering visible light that passes through it.

39. A display monitor according to claim 25 further comprising a reflection plate which redirects light from the light source toward the display screen.

40. A display monitor according to claim 25 wherein the condenser comprises an exterior surface having fins.

41. A display monitor according to claim 25 further comprising a fan positioned relative to the condenser to blow air across the condenser.

42. A display monitor according to claim 25 wherein the container is located adjacent the liquid crystal display screen.

43. A liquid crystal display monitor comprising:

a liquid crystal display screen;

a light source which generates heat and which provides back lighting to the display screen, the light source having a first side and a second side;

a first flexible translucent container in contact with the first side of the light source and positioned between the light source and the display screen;

a second flexible translucent container in contact with the second side of the light source;

a bypass tube allowing fluid communication between the containers;

a coolant liquid contained within the containers, a portion of which coolant vaporizes from absorption of the heat from the light source; and a condenser in fluid communication with both containers, the condenser receiving vaporized coolant from the containers and drawing thermal energy from the vaporized coolant to return the vaporized coolant to a liquid state.

44. A display monitor according to claim 43 further comprising a diffuser for scattering light emitted from the light source prior to its reaching the display screen.

45. A display monitor according to claim 43 further comprising a fan positioned relative to the condenser to blow air across the condenser.

46. A method of cooling a light source which generates heat and which generates light which illuminates a destination to be illuminated, the method comprising:

locating a translucent container proximate to a surface of the light source such the the container is positioned between the light source and the destination to be illuminated, and the light from the light source passes through a portion of the container before reaching the destination to be illuminated;

absorbing the heat from the light source with a coolant liquid located within the container such that a portion of the coolant vaporizes;

providing a condenser in fluid communication with the container; and drawing thermal energy from the vaporized coolant with the condenser such that the vaporized coolant returns to a liquid state.

47. A method according to claim 46 further comprising locating the light source within the container.

48. A method according to claim 46 wherein the translucent container is a first translucent container which is located to a first side of the light source and wherein the method further comprises:

locating a second translucent container to a second side of the light source;

providing fluid communication between the first translucent container and the second translucent container to allow the coolant to flow therebetween such that a first portion of the coolant liquid is located in the first container and a second portion of the coolant liquid is located in the second container;

providing fluid communication between the second translucent container and the condenser; and absorbing the heat from the light source with the second portion of the coolant liquid, such that a portion of the second portion of the fluid liquid vaporizes.

49. A method according to claim 46 further comprising blowing air across the condenser.

50. A method of providing back lighting for the display screen of a liquid crystal display monitor, the method comprising:

providing a light source which generates heat and which generates light that illuminates the display screen;

locating a translucent container proximate to a surface of the light source and positioning the container such that the light generated by the light source passes through a portion of the container before reaching the display screen;

absorbing the heat from the light source with a coolant located within the container such that a portion of the coolant vaporizes;

providing a condenser in fluid communication with the container; and drawing thermal energy from the coolant with the condenser such that the vaporized coolant returns to a liquid state.

* * * * *